(12) United States Patent
Herut

(10) Patent No.: US 9,290,114 B2
(45) Date of Patent: Mar. 22, 2016

(54) VEHICULAR SEAT

(71) Applicant: Celine Herut, Beer Sheva (IL)

(72) Inventor: Celine Herut, Beer Sheva (IL)

( * ) Notice: Subject to any disclaimer, the term of this patent is extended or adjusted under 35 U.S.C. 154(b) by 0 days.

(21) Appl. No.: 14/406,532

(22) PCT Filed: Mar. 12, 2013

(86) PCT No.: PCT/IL2013/050224
§ 371 (c)(1),
(2) Date: Dec. 9, 2014

(87) PCT Pub. No.: WO2013/186771
PCT Pub. Date: Dec. 19, 2013

(65) Prior Publication Data
US 2015/0130235 A1 May 14, 2015

(30) Foreign Application Priority Data
Jun. 12, 2012 (IL) .......................................... 220323

(51) Int. Cl.
*B60N 2/26* (2006.01)
*B60N 2/30* (2006.01)
*B60N 2/06* (2006.01)
*B60N 2/22* (2006.01)
*B60N 2/28* (2006.01)

(52) U.S. Cl.
CPC ................ *B60N 2/3084* (2013.01); *B60N 2/06* (2013.01); *B60N 2/22* (2013.01); *B60N 2/26* (2013.01); *B60N 2/2878* (2013.01); *B60N 2/3081* (2013.01); *B60N 2002/2896* (2013.01)

(58) Field of Classification Search
CPC .. B60N 2/3084; B60N 2/3081; B60N 2/2839; B60N 2/286; B60N 2/26; B60N 2/2878; B60N 2/06; B60N 2/22; B60N 2002/2896
USPC ........................................... 297/238, 219.12
See application file for complete search history.

(56) References Cited

U.S. PATENT DOCUMENTS

| 2,966,201 | A | * | 12/1960 | Strahler | 297/238 |
| 4,690,449 | A | * | 9/1987 | Holman | 296/64 |
| 4,902,070 | A | * | 2/1990 | Casale et al. | 297/238 |
| 4,936,627 | A | * | 6/1990 | Guim | 297/238 |
| 4,986,600 | A | * | 1/1991 | Leblanc et al. | 297/238 |
| 2001/0004162 | A1 | | 6/2001 | Yamazaki | |
| 2002/0014793 | A1 | * | 2/2002 | Santha | 297/219.12 |

FOREIGN PATENT DOCUMENTS

| EP | 0348374 | 12/1989 |
| JP | 622061 | 3/1994 |
| WO | WO2009086579 | 7/2009 |
| WO | WO2013024959 | 2/2013 |

* cited by examiner

*Primary Examiner* — Milton Nelson, Jr.
(74) *Attorney, Agent, or Firm* — Edward Langer Adv. & Patent Attorney

(57) ABSTRACT

A vehicular seat, comprising: a niche in a backrest of the vehicular seat, for placing therein a baby seat in a stowed state thereof; a baby seat, in which the size thereof enables placing thereof into the niche in a stowed state of the baby seat; a linear axle, for connecting the baby seat to the vehicular seat, and for allowing moving the baby seat away from the vehicular seat while connected to the vehicular seat; a rotational axle, for connecting the backrest of the baby seat to the seat rest of the baby seat, and enabling changing the angle therebetween; a first fastener for fixing the linear axle in the current situation thereof; and a second fastner for fixing the rotational axle in the current situation thereof.

12 Claims, 6 Drawing Sheets

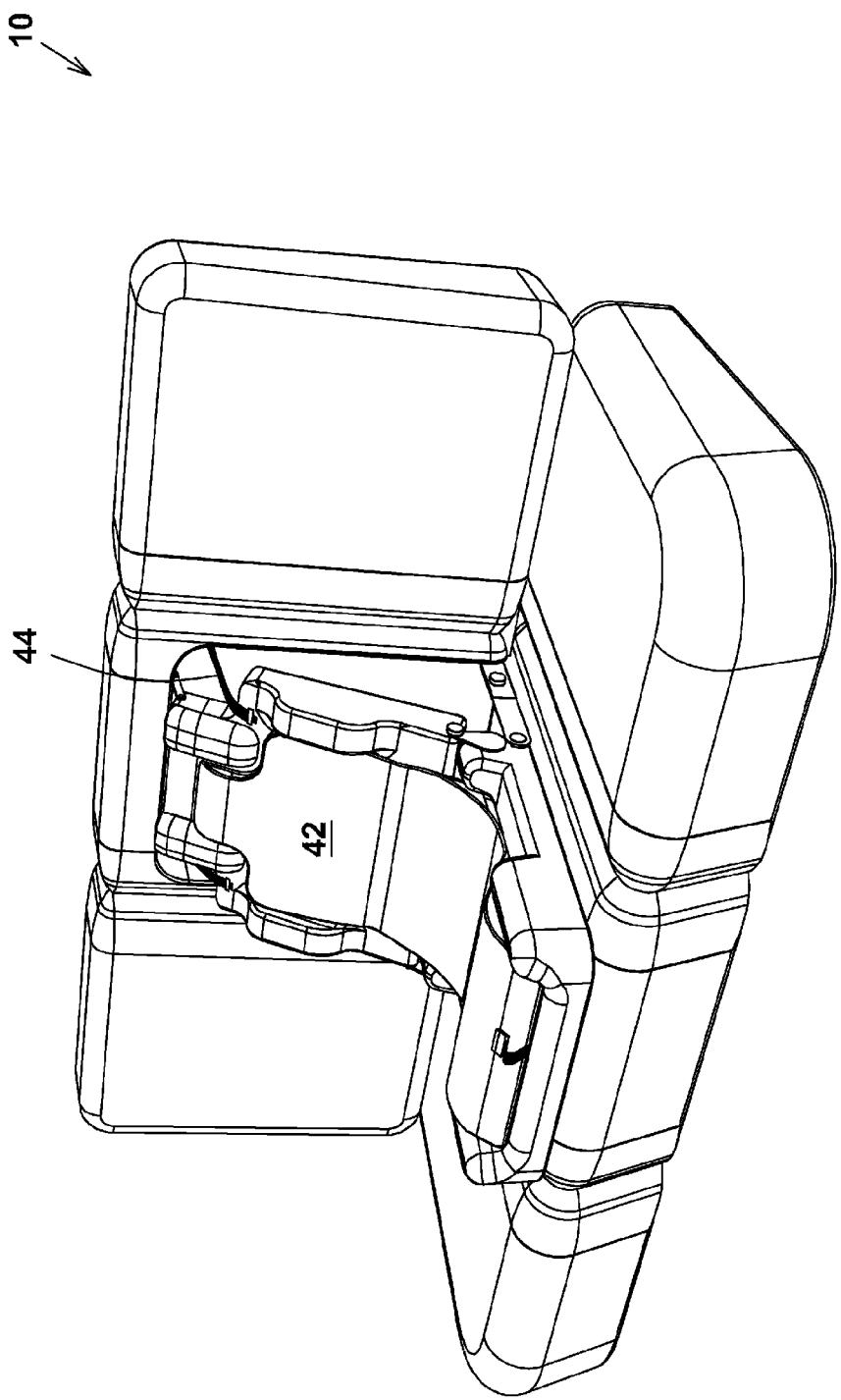

VEHICULAR SEAT

FIELD OF THE INVENTION

The present invention relates to the field of vehicular seats. More particularly, the invention relates to a vehicular seat, in which is embedded a baby seat.

BACKGROUND OF THE INVENTION

In many countries, the use of baby seats in a vehicle is mandatory by legislation, as this subject has been indicated as essential to the safety of an infant sitting in the vehicle. But, on the other hand, when the baby seat is not in use, the volume of the vehicle's cabin is reduced, and actually the unused baby seat occupies an adult seat.

It is an object of the present invention to provide a solution to the above-mentioned and other problems of the prior art.

Other objects and advantages of the invention will become apparent as the description proceeds.

SUMMARY OF THE INVENTION

In one aspect, the present invention is directed to a vehicular seat (10), comprising:

a niche (14) in a backrest (12) of the vehicular seat (10), for placing therein a baby seat in a stowed state thereof;

a baby seat (20), the size thereof enabling placing thereof into the niche (14) in a stowed state of the baby seat (20), preferably such that a surface of the baby seat (20) is even with a surface of the backrest (12) of the vehicular seat (10), wherein the baby seat (20) has a backrest (24) and a seat rest (22);

a linear axle (30), for connecting the baby seat (20) to the vehicular seat (10), and for allowing moving the baby seat (20) away from the vehicular seat (10) while connected to the vehicular seat (10);

a rotational axle (28), for connecting the backrest (24) of the baby seat (20) to the seat rest (22) of the baby seat (20), and enabling changing the angle therebetween;

fixing means (48), for fixing the linear axle (30) in the current situation thereof;

fixing means (46), for fixing the rotational axle (28) in the current situation thereof;

thereby allowing storing the baby seat in a stowed state thereof into the vehicular seat, resulting in stowing the baby seat (20) in a vehicle thereof without using additional space of a cabin of the vehicle; and enabling to adjust the angle between the backrest (24) of the baby seat, and the seat rest (22) of the baby seat.

The baby seat may further comprise safety belt(s) (32).

The baby seat may further comprise padding (34).

The padding may be adapted to limit the ability of an infant's head, head and feet to move from left to right and vice versa while sitting in the baby seat.

According to one embodiment of the invention, the baby seat comprises detachable additional padding (42) and connecting means (44) for connecting the additional padding (42) to the baby seat (20), thereby enabling using the baby seat (20) by infants of different size.

Preferably, the edges of the niche (14) are of about 5-10 cm from the edges of the vehicular seat (10).

The vehicular seat may be a front seat of a vehicle, as well as a back seat of a vehicle.

Preferably, the linear axle is a telescopic pole, preferably of two quadrangular segments.

According to one embodiment of the invention, the baby seat is adapted to be turned from a stowed state thereof to a use state thereof by the steps of:

a. linearly pulling the baby seat out of the vehicular seat;
b. rotationally unfolding the baby seat;
c. adjusting a linear situation of the baby seat with reference to the vehicular seat;
d. adjusting an angle of a backrest of the baby seat with reference to a seat rest thereof;
e. eliminating linear movement of the baby seat with reference to the vehicular seat; and
f. eliminating rotational movement of a backrest of the baby seat with reference to a seat rest of the baby seat.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF THE DRAWINGS

Embodiments and features of the present invention are described herein in conjunction with the following drawings:

FIGS. 1 to 4 schematically illustrate a vehicular back seat in which is installed a baby seat, according to one embodiment of the invention, wherein:

FIG. 1 illustrates the baby seat in its stowed state;
FIG. 2 illustrates the baby seat in its pulling state;
FIG. 3 illustrates the baby seat in its unfolding state; and
FIG. 4 illustrates the baby seat in its adjusting state.

FIG. 6 schematically illustrates the vehicular seat of FIG. 4, in which an additional padding 42 has been placed on the baby seat 20.

Figure 1:
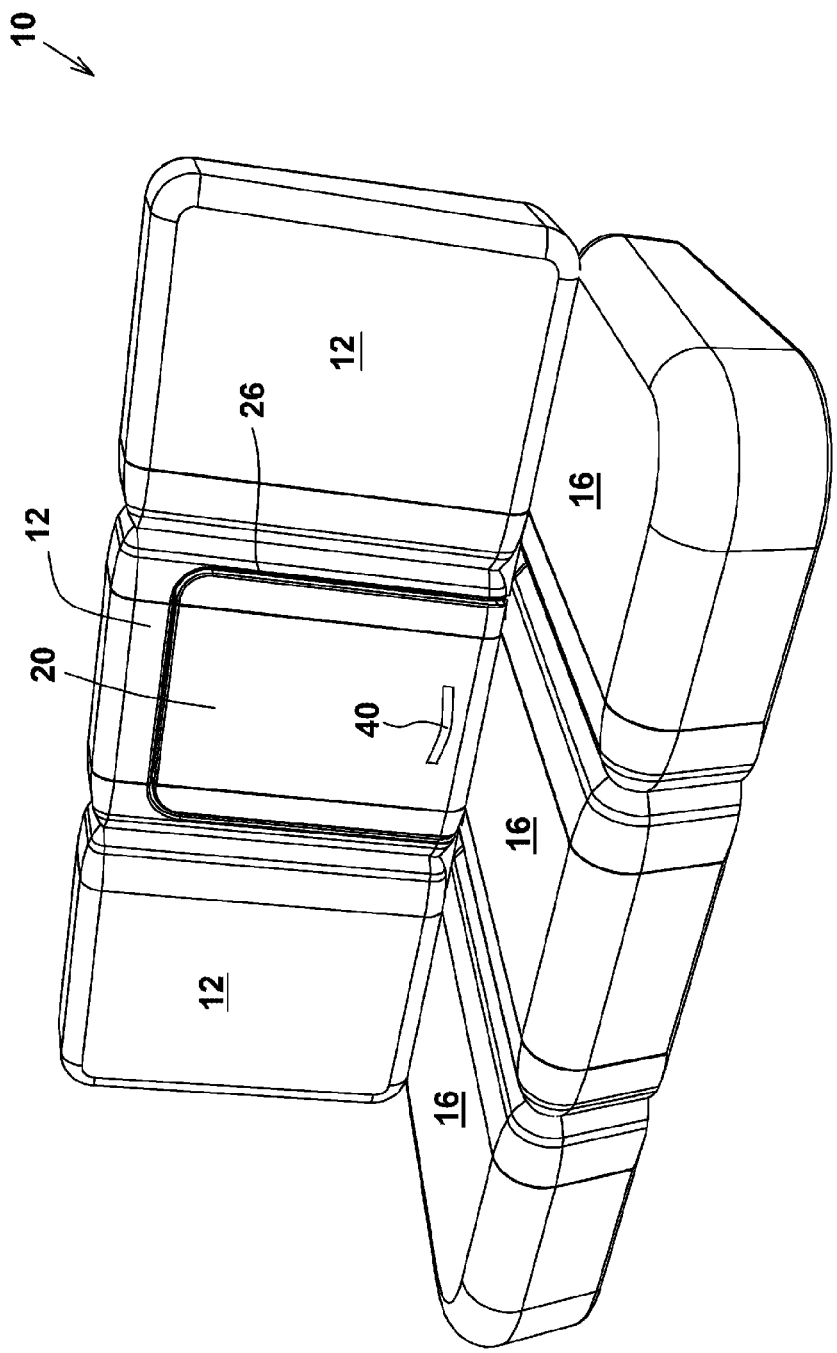

It should be understood that the drawings are not necessarily drawn to scale.

DETAILED DESCRIPTION OF PREFERRED EMBODIMENTS

The present invention will be understood from the following detailed description of preferred embodiments, which are meant to be descriptive and not limiting. For the sake of brevity, some well-known features, methods, systems, procedures, components, circuits, and so on, are not described in detail.

FIGS. 1 to 4 schematically illustrate a vehicular back seat in which is installed a baby seat, according to one embodiment of the invention.

The vehicular seat is generally marked herein by reference numeral 10, while the baby seat is generally referred by reference numeral 20.

Figure 2:
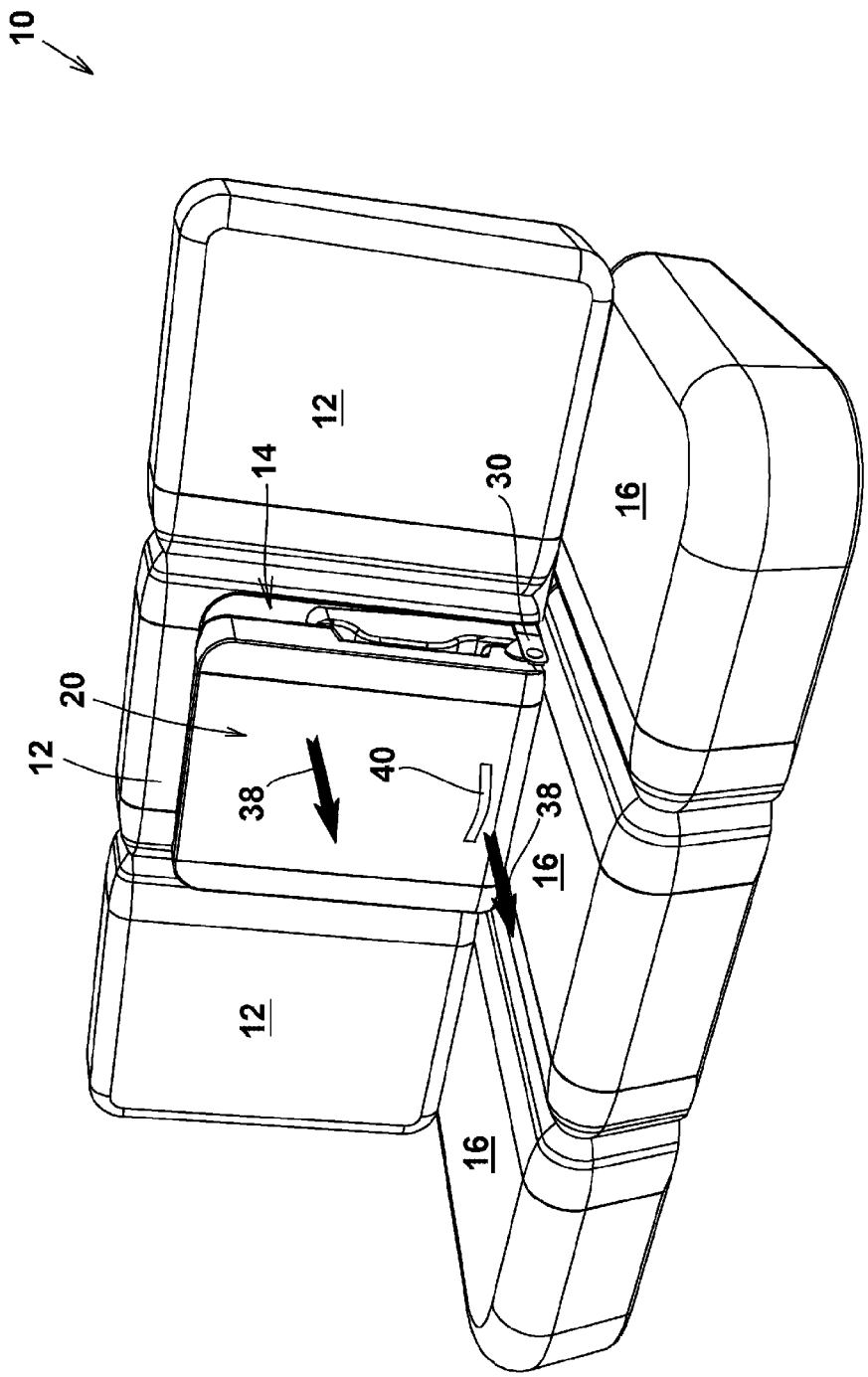
Figure 3:
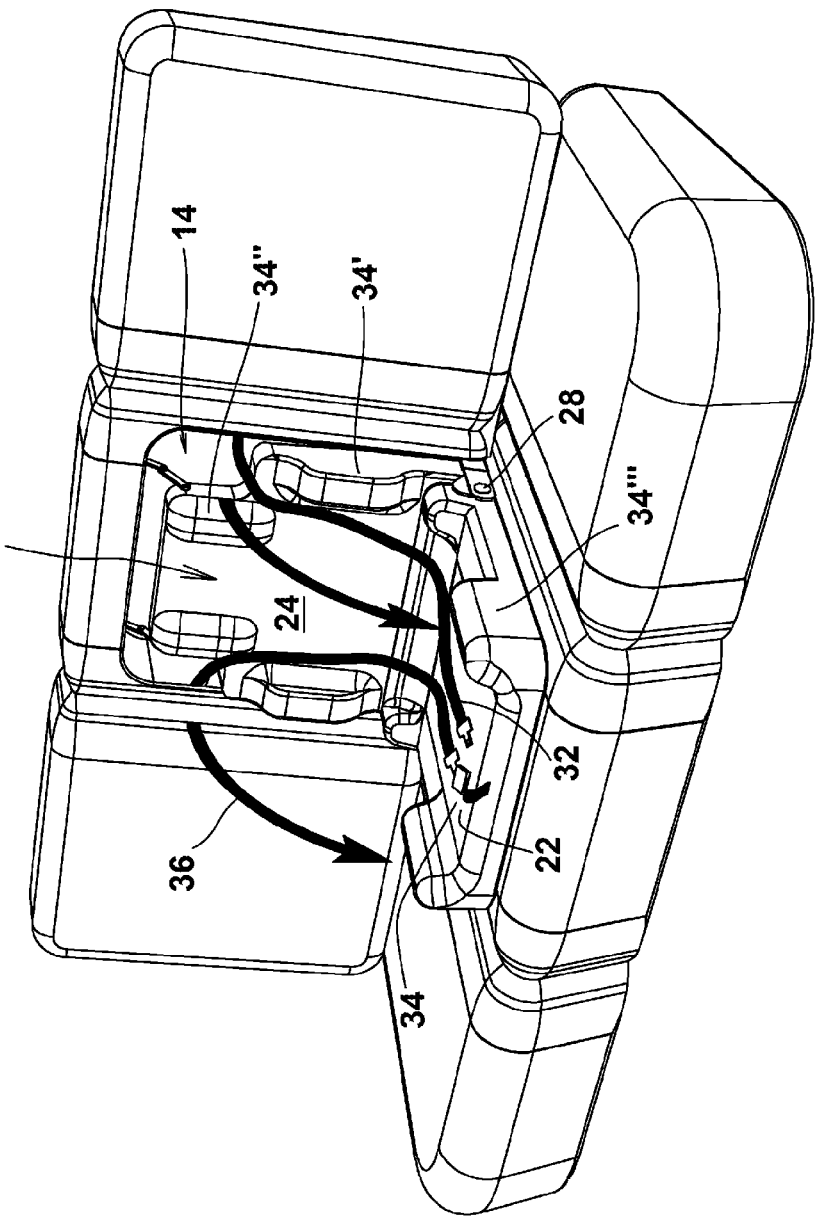
Figure 4:
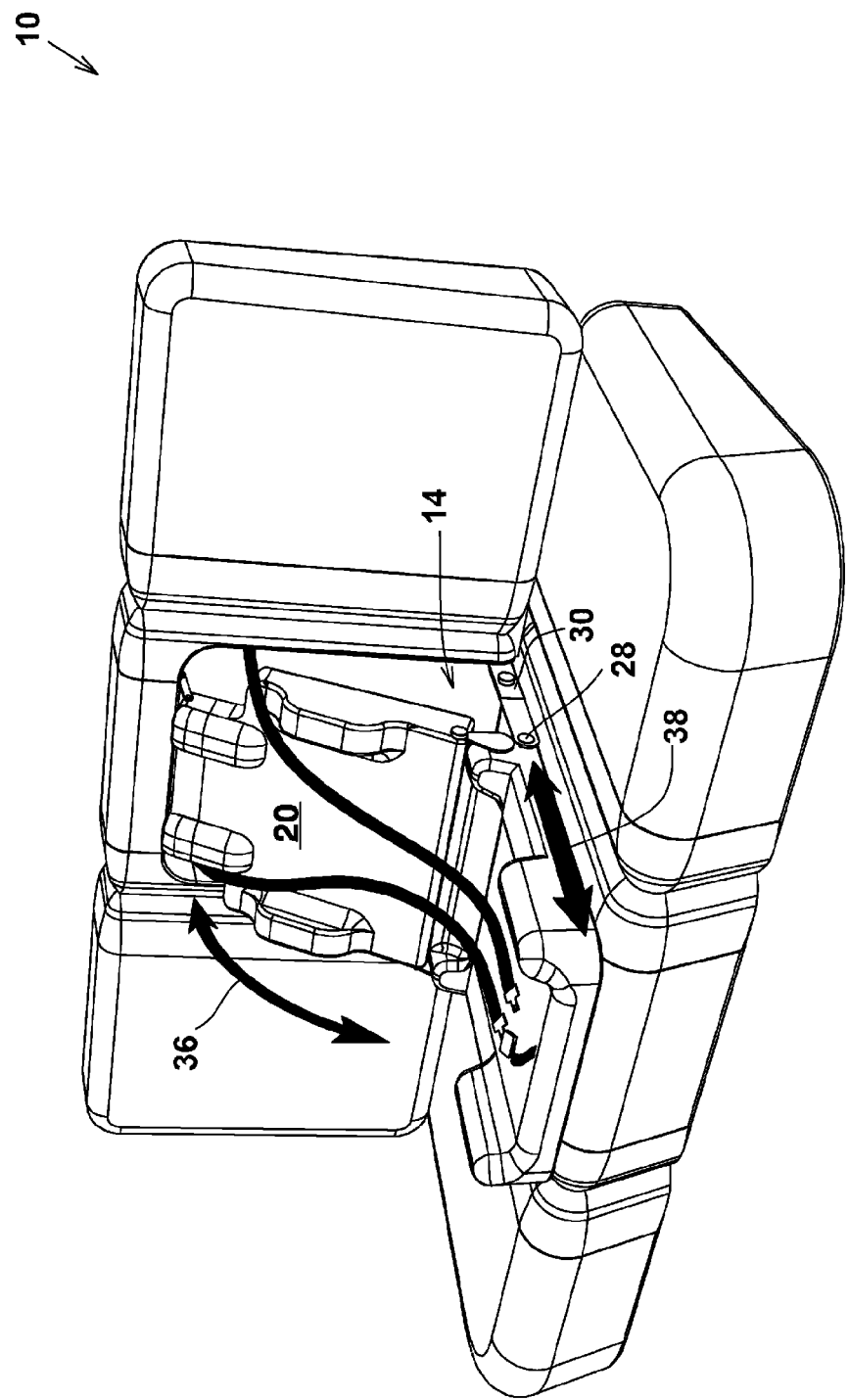

Each of FIGS. 1 to 4 schematically illustrates the baby seat in an operational state thereof, as follows:

FIG. 1 illustrates the baby seat in its stowed state;
FIG. 2 illustrates the baby seat in its pulling state;
FIG. 3 illustrates the baby seat in its unfolding state; and
FIG. 4 illustrates the baby seat in its adjusting state.

FIG. 1 illustrates the baby seat in its stowed state. The baby seat 20 is embedded in backrest 12 of vehicular seat 10 such that in the stowed state thereof, the surface of baby seat 20 is even with the surface of the backrest of the vehicular seat 10.

In addition, edges 26 of the baby seat are disposed near (about 5 to 10 cm) the edges of the backrest, thereby eliminating contact between edges 26 of the baby seat and the back of an adult sitting on this seat.

FIG. 2 illustrates the baby seat in its pulling state, which is the first stage in placing the baby seat in a use state. A user pulls handle 40 (illustrated in FIG. 1) in the direction illustrated by arrows 38. The baby seat moves forward on a linear axle, which in this case is embodied as a telescopic pole 30.

The term "linear axle" refers herein to a mechanism that provides linear movement of an object. A telescopic pole is a linear axle, as one edge thereof moves linearly with reference to the other edge thereof. Accordingly, the term "linear axis" refers herein to a linear moving course.

The baby seat is stowed inside a niche 14 of vehicular seat 10 in a folded state (of the baby seat). As such, a user (adult) must unfold the baby seat prior to use by an infant.

FIG. 3 illustrates the baby seat in its unfolding state.

The baby seat comprises two major parts, a seat rest 22 and a backrest 24, which are pivotally connected by axle 28. Thus, baby seat 20 is foldable along axle 28. Reference numeral 36 denotes a rotation course of seat rest 22 with reference to backrest 24, when unfolding the baby seat 20.

Also shown in this figure, the baby seat 20 comprises a padding 34, which provides comfort to an infant sitting in the baby seat. Both the seat rest and the backrest are covered with padding.

It should be noted that at the edges of the baby seat, padding 34' provides support for preventing the infant's back from shaking from left to right. In addition, head support 34" and feet support 34''' are used for the same purpose.

Safety belts 32 are used for securing an infant to the baby seat, thereby preventing the infant from being thrown forward during emergency braking.

FIG. 4 illustrates the baby seat in its adjusting state. In this state, there are two degrees of freedom: linear (forward) degree of freedom, which is marked herein by arrow 38, and rotational degree of freedom, which is marked herein by arrow 36. The linear degree of freedom is provided by telescopic pole 30, and the rotational degree of freedom is provided by axle 28.

Thus, a user (adult) can adjust: (a) the distance of the baby seat from the backrest of vehicular seat 10, (b) the angle between the seat rest of the baby seat, and the backrest thereof. Furthermore, the angle between the seat rest and the backrest of the baby seat 20 can be adjusted without changing the angle between the seat rest and the backrest of the vehicular seat 10. Furthermore, the angle between the seat rest and the backrest of the vehicular seat 10 can be adjusted without changing the angle between the seat rest and the backrest of the baby seat 20.

Figure 5:
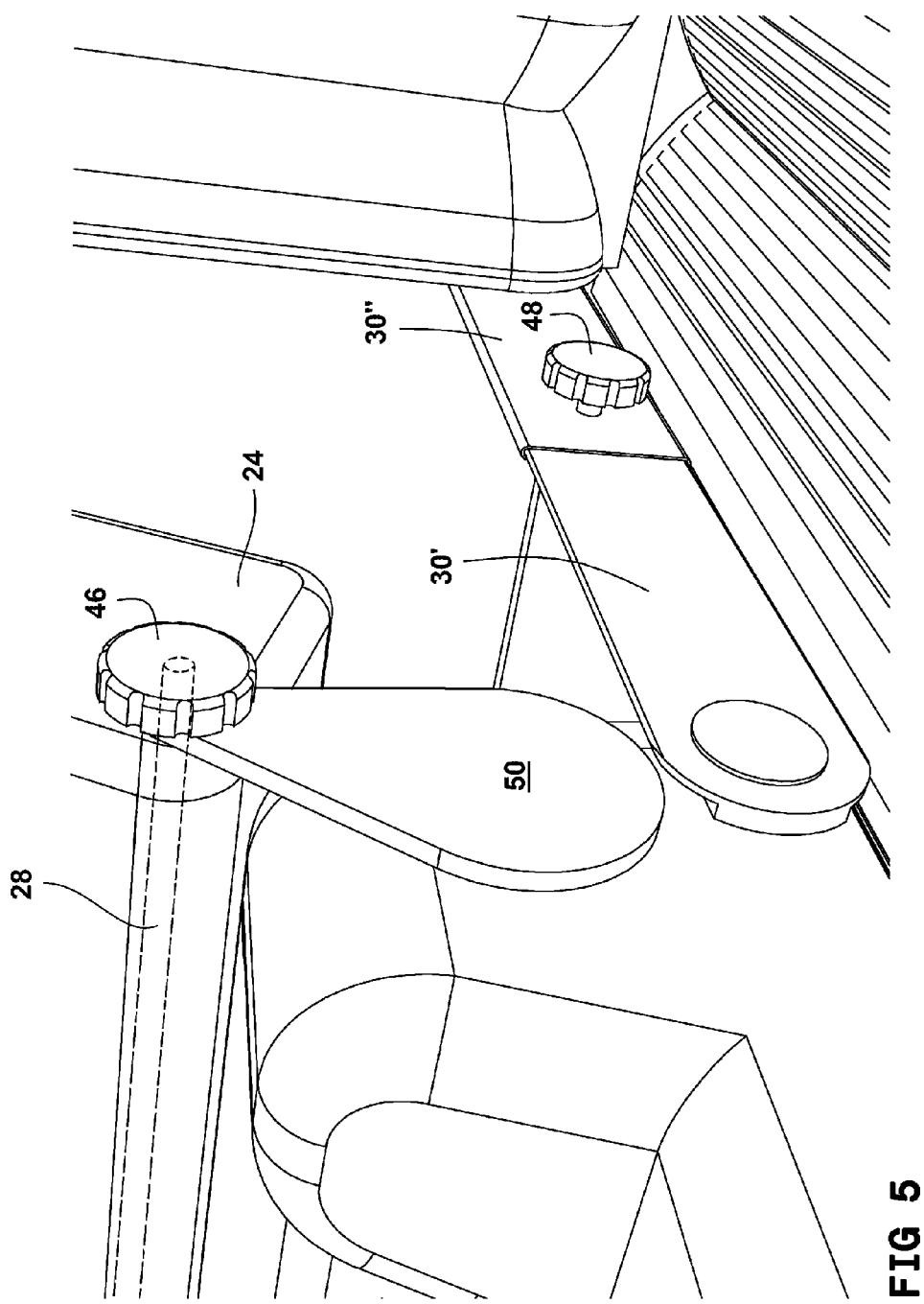
FIG. 5 is a focused view schematically illustrating fixing means for fixing the baby seat of FIG. 1 in its current situation, to the vehicular seat.

FIG. 5 is a focused view schematically illustrating fixing means for fixing the baby seat in the current situation, according to one embodiment of the invention.

Knob nut 48 is used for securing segments 30' and 30" of the telescopic pole to each other, thereby eliminating the linear movement from the telescopic pole.

Knob nut 46 is used for securing support 50 (of axle 28) to backrest 24 of the baby seat, thereby eliminating the rotational freedom from backrest 24.

It should be noted that in order to provide massive structure to the linear axle (telescopic pole), the segments of the telescopic pole are quadrangular. Also, the telescopic pole comprises only two segments, in order to allow fixing thereof to its current by a single screw (knob nut 46).

In a design of a vehicular seat according to embodiments of the present invention, the telescopic pole and its connection to the vehicular seat 10 should be able to resist in a car crash, preventing the baby seat from detaching from the vehicular seat.

FIG. 6 schematically illustrates the vehicular seat of FIG. 4, in which an additional padding 42 has been placed on the baby seat 20. The additional padding is designed to allow placing therein an infant of smaller size. Reference numeral 44 denotes attaching means for attaching the additional padding 42 to the baby seat 20.

Of course, the fixing means illustrated herein are merely a simplified example, and they can be implemented in a much better way, enabling easier operation, better safety to an infant, and so on.

In the figures and/or description herein, the following reference numerals have been mentioned:

numeral 10 denotes a vehicular seat;
numeral 12 denotes a backrest of vehicular seat 10;
numeral 14 denotes a niche in backrest 12 of the vehicular seat 10, for placing therein a baby seat in a stowed state;
numeral 16 denotes a seat rest of vehicular seat 10;
numeral 20 denotes a baby seat;
numeral 22 denotes a seat rest of baby seat 20;
numeral 24 denotes a backrest of baby seat 20;
numeral 26 denotes an edge of baby seat 20;
numeral 28 denotes an axle, providing a rotational illustrated by axis 36;
numeral 30 denotes a telescopic pole, for providing linear axis 38, as an example of a linear axle;
number 30' denotes a first segment of pole 30, and number 30" denotes a second segment of telescopic pole 30;
numeral 32 denotes a safety belt;
numeral 34 denotes a padding;
numeral 34' denotes a support of padding 34 for preventing an infant's back from shaking from left to right;
numeral 36 denotes a rotational axis/rotational degree of freedom, illustrated by an arrow;
numeral 34" denotes a support of padding 34 for preventing an infant's feet from shaking from left to right;
numeral 38 denotes a linear axis/linear degree of freedom, illustrated by an arrow;
numeral 40 denotes a handle for pulling baby seat 20;
numeral 42 denotes an additional padding, for baby seat 20;
numeral 44 denotes means for attaching the additional padding 42 to baby seat 20;
numeral 46 denotes a knob nut, as an example of fixing means for eliminating a rotational movement;
numeral 48 denotes a knob nut, as an example of fixing means for eliminating linear movement; and
numeral 50 denotes an element that connects backrest 24 to seat rest 22 of the baby seat; it is used also as a support for axle 28.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The following references are considered as the closest prior art: EP0348374, JP06-22061, US2001/0004162.

With reference to these publications, the present invention discloses a novel feature: an ability to change the angle between the backrest 24 and seat rest 22 of the baby seat 20 independently of the angle between the back rest 12 and seat rest 16 of the vehicle's seat 10. This ability is obtained as a result of the ability to slide the baby's seat rest independently from the vehicle's seat rest along the linear axis 38 generated by segments 30' and 30" of the telescopic pole 30.

The reference numbers in the claims are not a part of the claims, but rather used for facilitating the reading thereof. These reference numbers should not be interpreted as limiting the claims in any form.

The invention claimed is:

1. A vehicular seat (10), comprising:
   a niche (14) in a backrest (12) of said vehicular seat (10), for placing therein a baby seat in a stowed state thereof;
   a baby seat (20), having a size which enables placement thereof into said niche (14) in a stowed state of said baby seat (20), such that a surface of said baby seat (20) is even with a surface of the backrest (12) of said vehicular seat (10), said baby seat (20) having a backrest (24) and a seat rest (22) oriented as said vehicular seat (10);
   a linear axle (30), for connecting said baby seat (20) to said vehicular seat (10), and for allowing movement of said baby seat (20) away from said vehicular seat (10) while being connected to said vehicular seat (10);
   a rotational axle (28), for connecting the backrest (24) of said baby seat (20) to the seat rest (22) of said baby seat (20), and enabling changing of the angle therebetween;
   a first (48), for fixing said linear axle (30) in a current situation thereof;
   a second fastener (46), for fixing said rotational axle (28) in a current situation thereof; and
   enabling adjustment of an angle between said backrest (24) of said baby seat, and said seat rest (22) of said baby seat separately from the backrest (12) and seat rest (16) of said vehiculaer seat (10).

2. A vehicular seat according to claim 1, wherein said baby seat further comprises at least one safety belt (32).

3. A vehicular seat according to claim 1, wherein said baby seat further comprises detachable additional padding (42) and connecting means (44) for connecting said additional padding (42) to said baby seat (20), thereby enabling using said baby seat (20) by infants of different size.

4. A vehicular seat according to claim 1, wherein said vehicular seat is a back seat of a vehicle.

5. A vehicular seat according to claim 1, wherein said vehicular seat is a front seat of a vehicle.

6. A vehicular seat according to claim 1, adapted to be turned from said stowed state to a use state by the steps of:
   a. linearly pulling said baby seat out of said vehicular seat;
   b. rotationally unfolding said baby seat;
   c. adjusting a linear situation of said baby seat with reference to said vehicular seat;
   d. adjusting said angle of said backrest of said baby seat with reference to its seat rest;
   e. eliminating linear movement of said baby seat with reference to said vehicular seat; and
   f. eliminating rotational movement of said backrest of said baby seat with reference to said seat rest of said baby seat.

7. A vehicular seat according to claim 1, wherein said linear axle is a telescopic pole.

8. A vehicular seat according to claim 7, wherein said telescopic pole comprises two quadrangular segments.

9. A vehicular seat according to claim 1, wherein said baby seat further comprises padding (34).

10. A vehicular seat according to claim 9, wherein said padding is adapted to limit an ability of an infant's head to move from left to right and vice versa while sitting in said baby seat.

11. A vehicular seat according to claim 9, wherein said padding is adapted to limit an ability of an infant's back to move from left to right and vice versa while sitting in said baby seat.

12. A vehicular seat according to claim 9, wherein said padding is adapted to limit an ability of an infant's feet to move from left to right and vice versa while sitting in said baby seat.

\* \* \* \* \*